Sept. 4, 1934.　　　A. E. KINSLEY　　　1,972,347
ANIMAL TRAP
Filed Jan. 31, 1933
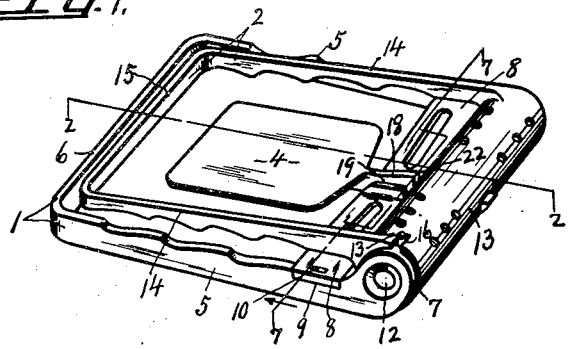
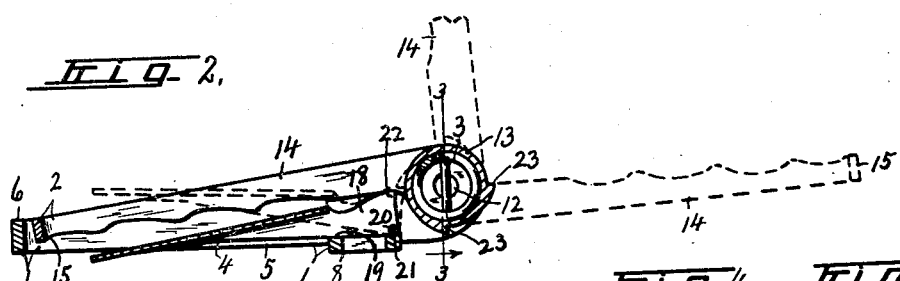
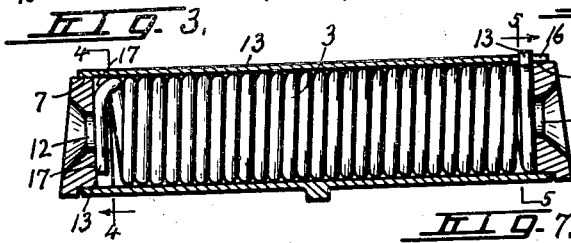
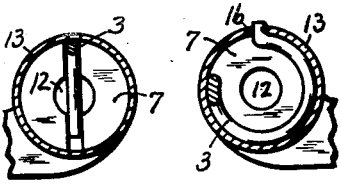
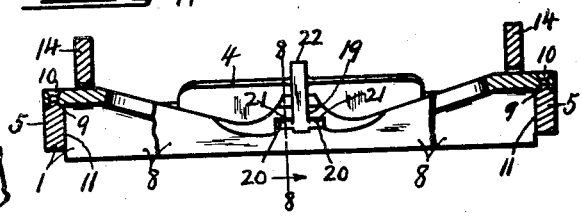
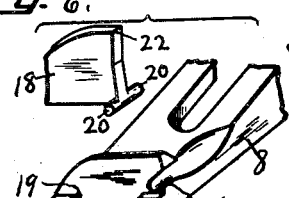
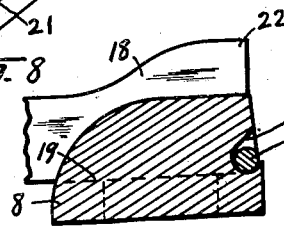
WITNESS
J. T. Mains
INVENTOR
A. E. Kinsley
BY
Denison & Thompson
ATTORNEYS Patented Sept. 4, 1934

1,972,347

UNITED STATES PATENT OFFICE 1,972,347

ANIMAL TRAP

Albert E. Kinsley, Norwich, N. Y.

Application January 31, 1933, Serial No. 654,452

5 Claims. (Cl. 43—81)

This invention relates to an animal trap in which a pair of jaws are pivotally connected to each other to swing about a common axis to and from their closed positions in combination with a co-axial coil spring normally urging said jaws toward their closed positions and a pivoted bait holder having means cooperating with one of the jaws for holding said jaws in their open positions against the action of the spring.

One of the objects of the invention is to provide one of the jaws and bait holder with co-operative means for holding the jaws in different open positions or at different angles relatively to each other.

Another object is to provide means for enclosing and concealing the jaw-actuating spring.

Other objects and uses relating to specific parts of the trap will be brought out in the following description.

In the drawing:—

Figure 1 is a perspective view of an animal trap embodying the various features of my invention in which the jaws are shown in their closed positions.

Figure 2 is an enlarged longitudinal vertical sectional view of the same trap taken in the plane of line 2—2, Figure 1, the bait pan being shown by dotted lines in position for holding one of the jaws in its open position, said jaws being also indicated by dotted lines in different open positions.

Figure 3 is an enlarged transverse vertical sectional view taken in the plane of line 3—3, Figure 2, showing more particularly the manner of attaching the spring to the jaws and also the barrel in which the spring is enclosed.

Figures 4 and 5 are detail sectional views taken respectively on lines 4—4 and 5—5, Figure 3.

Figure 6 is a perspective view of fragmentary portions of the cross bar of one of the jaws and adjacent portion of the bait-supporting lever.

Figure 7 is an enlarged transverse vertical sectional view taken in the plane of line 7—7, Figure 1.

Figure 8 is an enlarged detail sectional view taken on line 8—8, Figure 7, showing more particularly the manner of attaching the bait-supporting pan to the cross bar of the base frame or lower jaw.

As illustrated, this animal trap comprises a pair of jaws 1 and 2, a coil spring 3 and a bait-holder 4.

For convenience of description and terminology of the claims, the jaws 1 and 2 may be described respectively as a base frame and a jaw frame in that the frame 1 is adapted to be supported upon the ground while the jaw frame 2 is movable toward and from the base frame.

Both of these frames are preferably made of malleable iron or equivalent moldable material, the frame 1 being preferably U-shaped in that it comprises opposite arms 5 connected at one end by a cross bar 6.

The free ends of the arms 5 are provided with cylindrical bearings or trunnions 7, said arms being connected by a cross bar 8 having its opposite ends seated in suitable recesses 9 in the upper edges of said arms and secured therein by rivets 10 or equivalent fastening means.

The cross bar 9 is located between the trunnions 7 and cross bar 6 and preferably adjacent said trunnions for holding the arms 5 against spreading, said cross bar 8 being extended downwardly between the arms 5 and provided with shoulders 11 for engaging the inner faces of said arms and thereby rigidly holding the arms against inward movement toward each other.

The cylindrical bearings or trunnions 7 are relatively short axially and are provided with central openings 12 for reducing the weight of the frame 1.

The jaw frame 2 is of slightly less length and width than the corresponding length and width of the base frame 1 so that its free end may pass freely between the opposite arms of the base frame and within the cross bar 6 to assure complete closing of the jaw upon the animal which may be caught between the jaws.

In other words, this jaw frame 2 comprises a cylindrical or barrel-like cross member 13 at one end and opposite side arms 14 projecting forwardly therefrom and having their front ends connected by a cross bar 15, thereby constituting an open frame with the barrel 13 at one end and the cross bar 15 at the opposite end together with the opposite arms 14 connecting the cross members.

The cylindrical barrel 13 is of about the same interior diameter as the cylindrical bearings or trunnions 7 and has its opposite ends journaled upon said bearings, thereby constituting a pivotal connection between the two frames 1 and 2 to permit them to open and close about the axis of the trunnions.

The coil spring 3 is enclosed within the tubular bearing 13 between the trunnions 7 and has one end engaged in a corresponding slot 16 in the adjacent end of the barrel 13 and its other end engaged in a radial slot 17 in the inner face of the opposite trunnion 7, said spring being tensioned to normally hold the jaws in their closed position with the inner edges of the arms 14 of the jaws 2 resting against the adjacent portions of the cross bar 8, as shown more clearly in Figures 1 and 7.

The bait-holder 4 is preferably made in the form of a pan or plate arranged substantially midway between the opposite arms 5 and also between the cross bars 6 and 8 of the base frame 1 and has its rear end provided with a reduced relatively flat extension 18 projecting rearwardly therefrom into a transverse groove 19 in the upper side of the cross bar 8 so that the opposite walls of the groove serve to hold the bait pan against lateral movement.

The extension 18 is provided with outwardly projecting trunnions 20 which are engaged in bearings 21 in opposite walls of the slot 19 and open at their rear ends to permit the trunnions to be inserted into the bearings from the rear side forwardly, as shown more clearly in Figures 2, 6, 7 and 8.

The extension 18 is arranged edgewise vertically and projects upwardly from the trunnions 20 some distance above the upper surface of the cross bar 8 and has its rear upper end angular in side elevation to form a pawl 22 rigid therewith.

The cylindrical bearing 13 is provided intermediate its ends with a plurality of, in this instance two, ratchet teeth or shoulders 23 arranged in circumferentially spaced relation and also in alinement with the pawl 22 to be engaged by the said pawl one at a time for holding the jaw 2 in different open positions or at different angles relatively to the jaw 1, as shown by dotted lines in Figure 2.

These shoulders 23 are preferably formed upon the periphery of the barrel 13 at an angle to each other of, in this instance about 90 deg., one of said shoulders being disposed at an angle of substantially 90 deg., to the plane of the arms 14 and normally at the lower side of the barrel when the jaw 2 is closed, the other shoulder being disposed in about the same plane as the arms 14 but normally at the rear side of the barrel.

It is now evident that if the jaw 2 is opened by hand from its normal closed position through an arc of approximately 90 deg., it will bring one of the shoulders 23 into registration with the pawl 22 at which time the elevation of the bait pan 4 by hand about the axis of its trunnions 20 will engage said pawl with the registering shoulder to hold the jaw 2 in its partially open position against the action of the spring 3.

Or, the jaw 2 may be swung to its extreme open position through an arc of approximately 180 deg., thereby bringing the other shoulder 23 into registration with the pawl 22 which is then operated by lifting the bait pan 4 to engage the registering shoulder and to hold the jaw in its extreme open position, as shown by dotted lines at the right of Figure 2, against the action of the spring 3.

One method of assembling the parts of the trap is to slide the barrel 13 telescopically over and upon the coil spring 3 to inter-engage the walls of the slot 16 with the adjacent outwardly protruding end of the spring, as shown in Figure 3, before the spring is placed under tension.

Before the cross bar 8 is secured to the opposite arms 5 the trunnion ends of said arms may be spread a sufficient amount to allow the barrel 13 to be inserted between them after which the trunnion ends of the arms may be compressed toward each other to cause the trunnions 7 to enter the adjacent ends of the barrel for pivotally connecting both of the frames 1 and 2.

These jaws may then be moved angularly about their pivotal axis until the other end of the spring is engaged in the radial slot of the adjacent trunnion so that one end of the spring will then be connected to the barrel 13 through the slot 16 and the other end to the adjacent trunnion through the radial slot 17.

The jaw 2 may then be rotated by hand one or more turns through the opening in the frame 1 in the proper direction for placing the spring under the desired tension whereupon the cross bar with the bait pan attached thereto may be placed in operative position in the recesses 9 and riveted in place to form a stop for limiting the closing movement of the jaw 2 and also to hold the rear ends of the arms 5 upon the trunnions 7 against lateral spreading movement.

That is, before the cross bar 8 is placed in operative position upon the lower frame 1, the trunnions 20 for the bait pan will have been inserted from the rear side forwardly into the slot 21 so that when the cross bar 8 with the bait pan thereon is placed in operative position the rear ends of the opposite walls of the slot 19 will be sufficiently close to the inner side of the barrel 13 to prevent rearward displacement of the trunnions 20 from their bearings 21 without in any way interfering with the movement of the shoulders 23 of the barrel 13 as the jaw 2 is rocked to different angular positions relatively to the jaw 1.

Under these conditions, the bait pan 4 and its pawl 22 may be rocked freely about the axis of its trunnions 20 irrespective of the angular movement of the jaw 2 to enable said pawl to be brought into engagement with any one of the shoulders 23 as the jaw 2 is swung to different positions indicated by dotted lines in Figure 2 for holding the jaw in either of said positions against the action of the spring 3.

It will be noted, however, that when the bait pan is tripped by the animal it lies solidly against the upper surface of the adjacent portion of the cross bar 8 to partially support the animal and allow the jaw 2 to impinge portions of the animal between said jaw and the marginal edges of the pan 4 as well as between both jaws, thereby effecting an instantaneous killing of the animal without seriously mutilating the pelt.

The entire trap constructed in the manner described is particularly strong and highly effective in trapping animals of widely varying sizes, but obviously some changes may be made in the details without departing from the spirit of the invention.

What I claim is:

1. An animal trap comprising a U-shaped frame having its opposite arms provided with trunnions, a jaw-frame having a barrel at one end journaled on said trunnions for angular movement, a coil spring housed within the barrel and having one end attached to the barrel and its other end attached to one of the trunnions, said spring being tensioned to close the jaw frame, means including a detent for holding said jaw frame in an open position against the action of said spring, and animal-operated means for tripping the detent.

2. In an animal trap, a U-shaped base-frame having its opposite arms provided with trunnions, a jaw-frame having a tubular housing journaled on said trunnions, a coil spring within said housing operatively connected to both frames for closing the same one upon the other, means including a detent for holding the jaw-frame in different open positions, and animal-operated means for tripping the detent.

3. In an animal trap, a U-shaped base-frame having its opposite arms provided with trunnions, a jaw-frame having a tubular housing journaled on said trunnions, a coil spring within said housing operatively connected to both frames for closing the same one upon the other, a cross bar connecting said arms and disposed in the path of closing movement of the jaw frame to form a stop therefor and also to hold said arms against spreading, means including a detent mounted on said cross-bar for holding the jaw-frame in different open positions, and animal-operated means for tripping the detent.

4. In an animal trap, a U-shaped base-frame having its opposite arms provided with trunnions, a jaw-frame having a tubular housing journaled on said trunnions, said housing having a plurality of peripheral shoulders arranged in circumferentially spaced relation, a coil spring within the housing for closing the jaw frame, a detent mounted on the base frame for engaging any one of said shoulders to hold the jaw frame in an open position, and animal-operated means for tripping the detent.

5. In an animal trap, a U-shaped base frame having its opposite arms provided with trunnions, a jaw-frame having a tubular housing journaled on said trunnions for angular movement about the axis thereof, a coil spring within said housing for closing the jaw-frame, a cross-bar connecting said arms in the path of closing movement of the jaw-frame, and a bait holder pivoted to the cross bar and provided with a detent, said housing being provided with peripheral shoulders arranged in circumferentially spaced relation and movable therewith into sequential registration with the detent, for engagement thereby to hold the jaw-frame in different open positions.

ALBERT E. KINSLEY.